(12) United States Patent
Cho et al.

(10) Patent No.: US 7,655,285 B2
(45) Date of Patent: Feb. 2, 2010

(54) ACRYLIC PRESSURE SENSITIVE ADHESIVE COMPOSITIONS

(75) Inventors: Hyun-ju Cho, Kimhae-si (KR); Jang-soon Kim, Daejeon (KR); Suk-ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/581,079

(22) Filed: Oct. 16, 2006

(65) Prior Publication Data

US 2007/0087133 A1  Apr. 19, 2007

(30) Foreign Application Priority Data

Oct. 14, 2005  (KR) .................. 10-2005-0097159

(51) Int. Cl.
*C09J 133/06* (2006.01)
(52) U.S. Cl. .................. 428/1.54; 428/355 AC; 349/122
(58) Field of Classification Search .......... 428/1.5, 428/355 AC, 1.54; 349/40, 96, 122
See application file for complete search history.

(56) References Cited

U.S. PATENT DOCUMENTS

| | | | | |
|---|---|---|---|---|
| 3,658,744 | A * | 4/1972 | Brindell et al. | 524/377 |
| 4,542,095 | A * | 9/1985 | Steklenski et al. | 430/527 |
| 4,759,983 | A * | 7/1988 | Knutson et al. | 428/343 |
| 5,508,107 | A * | 4/1996 | Gutman et al. | 428/339 |
| 5,717,015 | A * | 2/1998 | Dust et al. | 524/236 |
| 5,885,708 | A * | 3/1999 | Lu et al. | 428/353 |
| 6,582,789 | B1 * | 6/2003 | Sumi | 428/40.1 |
| 6,592,988 | B1 * | 7/2003 | Thompson et al. | 428/375 |
| 2003/0114560 | A1 * | 6/2003 | Yang et al. | 524/154 |
| 2003/0181557 | A1 * | 9/2003 | Suzuki et al. | 524/334 |

FOREIGN PATENT DOCUMENTS

| | | |
|---|---|---|
| JP | 06-128539 | 5/1994 |
| JP | 2004-287199 | 10/2004 |
| KR | 2004-0030919 | 11/2005 |
| WO | WO 9504356 | 2/1995 |
| WO | WO 03/011958 A1 | 2/2003 |
| WO | WO 2007043822 * | 4/2007 |

OTHER PUBLICATIONS

JPO Website Machine English Translation of JP 06-128539, Kuroya Takamasa, May 10, 1994.*

* cited by examiner

*Primary Examiner*—Sophie Hon
(74) *Attorney, Agent, or Firm*—McKenna Long & Aldridge LLP

(57) ABSTRACT

The present invention relates to acrylic adhesive compositions, and more precisely, acrylic adhesive compositions having improved anti-static capacity without damaging durability, transparency and peel strength which are composed of an acrylic copolymer, a hydrophilic complex compound and a hydrophobic complex compound to sufficiently inhibit the development of static electricity, regardless of the surface condition (hydrophobicity or hydrophilicity) of a polarizing plate.

20 Claims, No Drawings

ACRYLIC PRESSURE SENSITIVE ADHESIVE COMPOSITIONS

This application claims the benefit of the filing date of Korean Patent Application No. 10-2005-0097159 filed on Oct. 14, 2005 in the Korean Intellectual Property Office, the disclosure of which is incorporated herein in its entirety by reference.

TECHNICAL FIELD

The present invention relates to acrylic adhesive compositions, and more precisely, acrylic adhesive compositions with excellent antistatic capacity, which can sufficiently inhibit the development of static electricity regardless of the surface condition (hydrophobicity or hydrophilicity) of a polarizing plate, and without damaging durability, transparency and peel strength.

BACKGROUND ART

Friction charging is one cause of static electricity, generated by friction between two subjects, and peeling charging is another cause of static electricity, generated by separation of a closely adhered subject. Static electricity can cause the adhesion of foreign materials, such as dust, electrostatic breakdown of a device, malfunctioning of a measuring instrument, and fire. According to the widespread use of mobile computers, liquid crystal TVs, and multifunctional cellphones, liquid crystal displays are in increasing demand and thus the inhibition of static electricity development caused by the integration of each auxiliary device has become a major concern.

According to the increasing demand for liquid crystal displays (LCD), optical films such as polarizing plates are also in demand, thus requiring high speed LCD production processes. Major LCD production companies have been focused on the production of small panels up to 20 inches, but recently, according to new techniques, the sizes of products has become larger than 20 inches.

Various treatments have been performed on the surface of polarizing plates. For example, the surface of a polarizing plate can be coated with an anti-glare layer, a low-refractive and/or high-refractive layer, and an anti-staining layer, and each layer has a different surface roughness and surface energy. In general, to produce the anti-glare layer, micro-sized inorganic particles are mixed with acrylic resin as a binder, followed by coating. At this time, the popular inorganic particle is micro-sized silica. So, the surface roughness of the anti-glare layer is coarser than that of the triacetyl cellulose layer itself. Thus, wettability of an adhesive applied to a protective film is very important. In the meantime, using acrylic resin binder induces hydrophobicity because of lowered surface energy, compared with the triacetyl cellulose layer.

With the realization of high-speed polarizing plate production, TFT IC device destruction has been observed during the peeling of a polarizing plate protective film, which is attributed to static electricity generation not common in the conventional processes, resulting in a poor LCD panel. It is known that TFT IC device destruction has been observed when at least 0.7 kV of electrostatic voltage is generated on the surface of a polarizing plate.

To avoid such a generation of static electricity, an anti-static layer has been applied on the outside of a polarizing plate or a protective layer, but the effect is controversial and static electricity development has not been controlled yet. Therefore, an anti-static function needs to be added to an adhesive layer to inhibit static electricity development from the beginning.

The conventional methods to add an anti-static function onto an adhesive layer are adding a compound having a conductive component such as conductive metal powder or carbon particles, and adding an ionic or non-ionic material in the form of a surfactant. In the case of adding the conductive metal powder or carbon particles to give an anti-static function, the required amount of such a compound is huge, resulting in a decrease in transparency. In the case of adding an ionic or non-ionic material in the form of a surfactant, the composition is affected easily by humidity and the adhesive property is reduced by bleeding into the surface of the adhesive.

Another conventional technique of eliminating static electricity is by using a static eliminator during the protective film separation process. This technique also has a problem of lowered productivity owing to the limitation of static elimination and slow processing speed.

Korean Patent Publication No. 2004-0030919 describes an organic salt being added by at least 5 weight % to give a pressure sensitive adhesive and an anti-static effect is brought about by inducing a specific resistance up to $10^{13}$ Ω/□ on the adhesive surface. However, according to this method, high priced organic salt has to be used and only surface resistance is reduced without predicting the variations of constant voltage caused by static electricity generated during the separation.

Japanese Laid-Open Patent Publication No.2004-287199 describes an ionic conductive polymer having a hydroxyl group being added to endow an anti-static function. However, this polymer is reacted with a conventional cross-linking agent (isocyanate), so that the adhesive property and the rheological property are changed, and accordingly the anti-static and adhesive capacities are out of control.

Japanese Laid-Open Patent Publication No. Hei6-128539 describes a method to generate an anti-static function by mixing a polyether polyol compound and one or more alkali metal salts. However, if the cross-linking agent used is isocyanate, the degree of cross-linking is vulnerable and the adhesive property is reduced by surface migration attributed to an ether bond (that is attributed to the hydrophilicity of ethylene oxide).

DISCLOSURE OF THE INVENTION

To overcome the above problems of the conventional techniques or methods, it is an object of the present invention to provide an acrylic pressure sensitive adhesive composition having excellent anti-static capacity, enabling full inhibition of the development of static electricity, regardless of the surface condition (hydrophilicity or hydrophobicity), on a polarizing plate without damaging durability, transparency and peel strength.

It is also an object of the present invention to provide an acrylic adhesive composition having excellent compatibility and anti-static capacity, enabling full inhibition of static electricity development without damaging durability, transparency and peel strength, a protective film, and an LCD device applied with the acrylic adhesive composition.

To achieve the above objects, the present invention provides an acrylic pressure sensitive adhesive composition which is characteristically composed of
 (a) an acrylic copolymer;
 (b) a hydrophilic complex compound; and
 (c) a hydrophobic complex compound.

The present invention also provides a protective film which characteristically contains an adhesive layer on one side or both sides of the substrate layer of the acrylic adhesive composition.

The present invention further provides an LCD device which characteristically contains a liquid crystal panel wherein a protective film layered polarizing plate is adhered on one side or both sides of the liquid crystal cell.

The present invention is described in detail hereinafter.

The present inventors applied different complex compounds having different properties but excellent compatibility to acrylic adhesive. The present inventors then completed this invention by confirming that the acrylic adhesive composition of the present invention is able to inhibit static electricity development satisfactorily regardless of the surface condition of an optical member.

The acrylic adhesive composition of the present invention characteristically contains an acrylic copolymer, a hydrophilic complex compound and a hydrophobic complex compound.

The acrylic copolymer of (a) is not limited to a specific compound and might be any conventional adhesive compound. For example, the acrylic copolymer is produced by copolymerization of i) 90~99.9 weight % of (meth)acrylic acid ester monomer having $C_1$~$C_{12}$ alkyl group and ii) 0.1~10 weight % of vinyl monomer having a cross-linkable functional group and/or acrylic monomer.

The (meth)acrylic acid ester monomer having $C_1$~$C_{12}$ alkyl group of i) can be $C_1$~$C_{12}$ alkyl ester, specifically one or more compounds selected from a group consisting of butyl (meth)acrylate, ethyl(meth)acrylate, methyl(meth)acrylate, n-propyl(meth)acrylate, isopropyl(meth)acrylate, t-butyl (meth)acrylate, pentyl(meth)acrylate, n-octyl(meth)acrylate, n-tetradecyl(meth)acrylate, 2-ethylhexyl(meth)acrylate, isooctyl(meth)acrylate, isononyl(meth)acrylate, and 2-ethylbutyl(meth)acrylate.

The (meth)acrylic ester monomer having $C_1$~$C_{12}$ alkyl group can be copolymerized with a co-monomer having a high glass transition temperature in order to give adhesive strength and cohesive strength to the acrylic copolymer.

Any monomer that has a vinyl group available for the conventional copolymerization can be used as the co-monomer of the present invention, and particularly methyl acrylate, methyl methcrylate, ethyl methcrylate, vinyl acetate, styrene or acrylonitrile can be used. The acceptable glass transition temperature of the co-monomer before cross-linking is −130~50° C.

The vinyl monomer and/or acrylic monomer having a cross-linkable functional group of ii) is reacted with a cross-linking agent to give cohesive strength or adhesive strength by chemical bonds to avoid destruction of the cohesive force of the adhesive at high temperature or under high humidity.

The vinyl monomer and/or acrylic monomer having a cross-linkable functional group of ii) can be one or more compounds selected from a group consisting of hydroxyl group containing monomers such as 2-hydroxyethyl(meth)acrylate, 2-hydroxypropyl(meth)acrylate, 4-hydroxybutyl (meth)acrylate, 6-hydroxyhexyl(meth)acrylate, 2-hydroxyethyleneglycol(meth)acrylate and 2-hydroxypropyleneglycol(meth)acrylate; a carboxyl group containing monomers such as (meth)acrylic acid, maleic acid and fumaric acid; and nitrogen containing monomers such as acryl amide, N-vinyl pyrrolidone and N-vinyl caprolactam.

The preferable content of the vinyl monomer and/or acrylic monomer having a cross-linkable functional group in the acrylic copolymer is 0.1~10 weight %. If the content is less than 0.1 weight %, cohesive failure will easily occur under high humidity or at high temperature. On the contrary, if the content is over 10 weight %, compatibility will be reduced, and thereby fluid character will also be reduced.

The acrylic copolymer comprising the above compounds can be prepared by solution polymerization, photo polymerization, bulk polymerization, suspension polymerization or emulsion polymerization, and in particular solution polymerization is preferred. The preferable reaction temperature for the polymerization is 50~140° C., and a preferable time point for adding an initiator is after mixing the monomers evenly.

The triacetyl cellulose layer is pre-treated in a basic solution and used as a polarizing plate. Alternatively, the polarizing plate is used after surface treatment. The surface treatment includes an anti-glare layer for use against exterior light such as fluorescent lamps and sunshine, and is produced by mixing acrylic resin and micro-size inorganic particles. While the triacetyl cellulose layer has hydrophilicity on its surface owing to the pre-treatment, the anti-glare layer has hydrophobicity originating from the acrylic resin and inorganic particles such as silica. Therefore, these two surfaces have different surface characteristics and thus an anti-static capacity of an adhesive composition is a prerequisite for such a polarizing plate having two different characteristics.

To maintain the anti-static capacity on such a polarizing plate having contrary surface characteristics, without reducing the adhesive property, the present inventors added (b) hydrophilic complex compound and (c) hydrophobic complex compound to the composition of the present invention.

The hydrophilic complex compound of (b) is composed of compounds having an alkylene oxide group and ionic compounds having hydrophilic anions.

The compound having alkylene oxide includes one or more repetitive units such as methylene oxide, ethylene oxide, propylene oxide and butylene oxide, and among them a compound harboring ethylene oxide and/or propylene oxide is preferred.

The weight average molecular weight of the compound harboring the alkylene oxide group is preferably 100~10,000. If the weight average molecular weight is less than 100, the capacity to form a complex with an ionic compound will be decreased, resulting in a decrease of the anti-static capacity. On the contrary, if the weight average molecular weight is more than 10,000, the fluid characteristics of the adhesive will be vulnerable.

The ionic compound having a hydrophilic anion can include one or more compounds selected from a group consisting of such anions as $ClO_4^-$, $I^-$, $Cl^-$, $Br^-$, $BF_4^-$, $PF_6^-$, $N_3^-$, $CH_3CO_2^-$, $HPO_4^{2-}$, $SO_4^{2-}$ or $NO_3^-$, and such cations as lithium, sodium, potassium, magnesium, calcium, barium or cesium. It is particularly preferred that the ionic compound having a hydrophilic anion includes $ClO_4^-$ as an anion and lithium or sodium as a cation.

The preferable molar ratio of the compound having an alkylene oxide group to the compound having a hydrophilic anion is 1/1~1/100 ([M$^+$]/[RO]; whereby [M$^+$] indicates the molarity of the ionic compound and [RO] indicates the molarity of the repetitive unit of the alkylene oxide group). If the mixing ratio of the alkylene oxide group containing compound to the hydrophilic anion containing compound is more than 1/1, the anti-static capacity will be decreased by the excessive metal salt. In the meantime, if the mixing ratio is less than 1/100, which means a low concentration of the anion, the anti-static capacity will also be decreased.

The hydrophilic complex compound is preferably included at 0.01~10 weight part for 100 weight part of the acrylic copolymer. If the content is less than 0.01 weight part, the anti-static capacity of an optical element having a hydrophilic surface will be reduced. In the meantime, if the content is more than 10 weight part, the adhesive property will be reduced.

The hydrophobic complex compound of (c) can be an inorganic or an organic ionic compound having a hydrophobic anion. The hydrophobic anion can be selected from a group consisting of $CF_3SO_3^-$, $N(CF_3SO_2)_2^-$, $N(CF_3CO)_2^-$, $N(C_2F_5SO_2)_2^-$, $N(C_2F_5CO)_2^-$, $N(C_4F_9SO_2)_2^-$, and $C(CF_3SO_2)_3^-$.

When the inorganic ionic compound is used as the hydrophobic complex compound, a cation is preferably selected from a group consisting of lithium, sodium, potassium, magnesium, calcium, barium or cesium. When the hydrophobic complex compound is an inorganic ionic compound, a compound that is able to form a complex with a metal cation can be added, and the applicable compound is a functional group such as oxalate, a polyvalent acid group, diamine or an acetyl ketone group containing compound.

When the hydrophobic complex compound is an organic ionic compound, such cations as cyclic or acyclic nitrogen onium cation or quarternary ammonium cation can be used. Particularly, the nitrogen onium cation can be selected from a group consisting of pyridinium, pyridazinium, pyrimidinium, pyrazinium, imidazolium, pyrazolium, thiazolium, oxazolium and triazolium.

The preferable content of the hydrophobic complex compound in 100 weight part of acrylic copolymer is 0.01~10 weight part. If the content is less than 0.01 weight part, the anti-static capacity for an optical element containing a hydrophobic surface will be reduced. On the contrary, if the content is more than 10 weight part, the adhesive property will be reduced.

The acrylic adhesive composition of the present invention, which is composed of an acrylic copolymer, a hydrophilic complex compound and a hydrophobic complex compound, can additionally include a cross-linking agent.

The adhesive strength can be regulated depending on the amount of a cross-linking agent used. The cross-linking agent is reacted with a carboxyl group and a hydroxyl group to improve the cohesive strength of the adhesive.

As a cross-linking agent, isocyanate compounds, epoxy compounds, aziridine compounds or metal chelate compounds can be used, and among these compounds, isocyanate compounds are preferred.

Particularly, the isocyanate compound can be selected from a group consisting of tolylenediisocyanate, xylenediisocyanate, diphenylmethnediisocyanate, hexamethylenediisocyanate, isoformdiisocyanate, tetramethylxylenediisocyanate, naphthalenediisocyanate, and their reactants with polyol, such as trimethylolpropane.

The epoxy compound can be selected from a group consisting of ethyleneglycoldiglycidylether, triglycidylether, trimethylolpropanetriglycidylether, N,N,N',N'-tetraglycidylethylenediamine and glycerindiglycidylether.

The aziridine compound can be selected from a group consisting of N,N'-toluene-2,4-bis(1-aziridinecarboxide), N,N'-diphenylmethne-4,4'-bis(1-aziridinecarboxide), triethylenemelanin, bisisoprothaloyl-1-(2-methylaziridine) and tri-1-aziridinylphosphineoxide.

Any compound in which a polyvalent metal such as aluminum, iron, zinc, tin, titan, antimony, magnesium and vanadium is coordinated in acetylacetone or acetoacetateethyl can be used as the metal chelate compound.

The preferable content of a cross-linking agent in 100 weight part of acrylic copolymer is 0.01~10 weight part. If the content is less than 0.01 weight part, the cohesive strength will be decreased and so will durability. On the contrary, if the content is more than 10 weight part, the adhesive property will be reduced, and thus wettability of the adherend will be reduced.

The acrylic adhesive composition of the present invention can additionally include tackifier resin, acrylic low-molecular polymer, epoxy resin, hardener, UV stabilizer, antioxidant, toning agent, reinforcing agent, filler, antifoaming agent, surfactant, plasticizer, blowing agent or organic salt.

A method for preparing the acrylic adhesive composition comprising the above compounds is not limited to a specific method. A cross-linking agent has to be carefully treated at the proper time point, since the cross-linking response of the functional group of the cross-linking agent must not be induced during the mixing process for an even coating. After coating, drying and aging, a cross-linking structure is formed giving elasticity, and the resultant adhesive layer exhibits a strong cohesive strength. At this time, owing to the strong cohesive strength of the adhesive, adhesive properties including durability and cutting-efficiency are improved.

The acrylic adhesive composition of the present invention preferably has a cross-linking density of 20~99%. If the cross-linking density is less than 20%, the cohesive strength of the adhesive will be decreased. On the other hand, if the cross-linking density is more than 99%, durability will be reduced.

The present invention also provides a protective film containing the acrylic adhesive composition of the present invention as an adhesive layer of a substrate.

The protective film herein indicates a film that protects the outermost layer of an optical film, particularly a polarizing plate, and is composed of a transparent substrate and an adhesive layer. One side or both sides of the substrate of the protective film can be coated with the adhesive layer formed by the adhesive composition of the present invention and an applicable transparent substrate film is not limited.

The transparent substrate film can be laminated with either one or multiple (at least two) layers and can be prepared in different thicknesses according to the purpose of use. However, the preferable thickness of the transparent substrate film is 5~500 μm and 10~100 μm is more preferable.

The transparent substrate film can be treated with a primer on one side or both sides to improve adherence with an adhesive and further loaded with an anti-static layer and an anti-staining layer.

A method for forming an adhesive layer on a polarizing film is not limited to a specific one, for example an adhesive can be directly spread on the surface of a substrate film or a polarizing film by using a bar coater, which is then dried, or the surface of a separating substrate is coated with an adhesive and dried, and then the formed adhesive layer is transcribed on the surface of a polarizing film, followed by aging. The thickness of the coated adhesive layer is preferably 2~100 μm and more preferably 5~50 μm. If the thickness is out of the above acceptable range, the adhesive layer will not be even, resulting in uneven adhesive film.

The protective film coated with the adhesive composition of the present invention can be applied to every conventional LCD device and an applicable liquid crystal panel is not limited to a specific kind. So, it is preferred to produce an LCD device by covering one side or both sides of the liquid crystal cell in the liquid crystal panel with a protective film coated with an adhesive.

The acrylic adhesive composition of the present invention can be applied to various industrial fields, for example for the production of industrial sheets, particularly protective films, cleaning sheets, reflective sheets, structural adhesive sheets, photographic adhesive sheets, adhesive sheets for traffic lanes, optical adhesive products, adhesives for electronic devices, etc. The acrylic adhesive composition of the present invention can be further applied to the production of multiple structured laminate products, commercial adhesive sheet products, medical patches, heat activated pressure sensitive adhesives, etc.

BEST MODE FOR CARRYING OUT THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

EXAMPLES

Example 1

(Preparation of Acrylic Copolymer)

To a 1 L reactor equipped with a cooling device for the regulation of temperature and the reflux of nitrogen gas was added a monomer mixture comprising 80.0 weight part of 2-ethylhexylacrylate (2-EHA), 17.0 weight part of n-butylacrylate (BA) and 3.0 weight part of 2-hydroxyethylacrylate (2-HEA), to which 100 weight part of ethylacetate (EAc) was added as a solvent. Oxygen was eliminated by purging nitrogen gas for one hour, and then the temperature was maintained as 55° C. To the reaction mixture was added 0.05 weight part of 50% azobisisobutylonitrile (AIBN) diluted in ethylacetate, followed by reaction for 8 hours to give the acrylic copolymer.

(Mixing and Coating)

To 100 weight part of the acrylic copolymer prepared above were added 3.0 weight part of hexamethylenediisocyanate prepolymer (HDI) as a cross-linking agent, 1.0 weight part of a hydrophilic complex compound composed of polyethyleneglycol fatty acid alkyl ester (PEG) and $NaClO_4$, and 1.0 weight part of a hydrophobic complex compound composed of dibutyl oxalate (DBOX) and $Li_2N(CF_3SO_2)$ (LiTFSI), which was diluted and mixed evenly. Then, one side of biaxially oriented polyethylene terephthalate film 38 μm thick was coated with the above mixture and dried, resulting in an even adhesive layer 20 μm thick.

(Laminating)

The adhesive layer covering one side of the polyethylene terephthalate film was laminated with release film, which was then aged and stored for 4 days at 23° C. with 55% humidity.

The prepared protective film was cut into appropriately sized pieces, which were attached on the triacetyl cellulose surface of a polarizing plate (TAC film, Fuji film, Japan) and the anti-glare layer surface (AG TAC, DNP, Japan) respectively, and the films were evaluated.

Examples 2~4 and Comparative Examples 1~5

Experiments were performed in the same manner as described in Example 1 except that compounds were used according to the compositions shown in Table 1. The unit presented in Table 1 is weight part.

The protective films prepared in Examples 1~4 and Comparative Examples 1~5 were tested for durability, haze, separation charging and peel strength by the following methods and the results are shown in Table 2.

a) Durability-The samples of the polarizing plate (200 mm×200 mm) coated with the protective films prepared in Examples 1~4 and Comparative Examples 1~5 were tested for detachment and exfoliation at high temperature (80□, 1000 hours) and at high temperature under high humidity (60□, 90% R. H., 1000 hours), and accordingly durability was measured based on the given standards below.

| | Evaluation Standard |
|---|---|
| o | No detachment or exfoliation was observed |
| □ | Some detachment or exfoliation was observed. |
| x | Detachment or exfoliation was observed. | b) Haze-The protective films prepared in Examples 1~4 and Comparative Examples 1~5 were cut into pieces in 40 mm×70 mm, with which diffusive transmittance Td and total luminous transmittance Ti were measured by JIS K7150 and ASTM D1003-95. Haze is defined by the percentage of Td for Ti. The test samples stood at 60° C. with 90% relative humidity for 1000 hours, followed by the measuring of haze in the same order as described above. Haze before and after standing was compared, leading to the evaluation of whitening.

c) Separation charging voltage-The protective films prepared in Examples 1~4 and Comparative Examples 1~5 were attached to the surfaces of the triacetyl cellulose (TAC, Fuji Film, Japan) and the anti-glare layer (AG, DNP, Japan) of a polarizing plate by using a 2 kg roller, and were then stored for 24 hours at 23° C. with 50% relative humidity. The size of the samples was 22×24 cm. During the separation at a speed of 40 m/min., static voltage generated on the surface of the polarizing plate was measured 1 cm above the surface by using the static voltage meter STATIRON-M2. To confirm the accuracy of the value, the measurement was repeated 10 times and the mean value was obtained.

d) 180° peel) strength-The protective films prepared in Examples 1~4 and Comparative Examples 1~5 were attached to the surfaces of the triacetyl cellulose (TAC, Fuji Film, Japan) and the anti-glare layer (AG, DNP, Japan) of a polar

TABLE 1

| | Example | | | | Comparative Example | | | | |
|---|---|---|---|---|---|---|---|---|---|
| | 1 | 2 | 3 | 4 | 1 | 2 | 3 | 4 | 5 |
| Acrylic copolymer | 100 | 100 | 100 | 100 | 100 | 100 | 100 | 100 | 100 |
| PEG/NaClO$_4$ | 1.0 | | 1.0 | | | 1.0 | | | 15 |
| PEG/LiClO$_4$ | | 0.5 | | 0.5 | | | | | |
| DBOX/LiTFSI | 1.0 | | | | | | 1.0 | | 1.0 |
| DBOX/LiBETI | | 0.5 | | | | | | | |
| HPyTFSI | | | 1.0 | 1.0 | | | | 1.0 | |
| HDI | 3.0 | 3.0 | 3.0 | 3.0 | 3.0 | 3.0 | 3.0 | 3.0 | 3.0 |

DBOX: dibutyl oxalate
PEG: fatty acid alkyl ester of polyethylene glycol
LiClO$_4$: lithium perchlorate
NaClO$_4$: sodium perchlorate
LiTFSI: lithium trifluoromethnesulfoneimide
LiBETI: lithium perfluoroethanesulfoneimide
HPyTFSI: 1-hexylpyridinium trifluoromethnesulfoneimide
HDI: prepolymer of hexamethylene diisocyanate izing plate by using a 2 kg roller based on JIS Z 0237, and were then stored for 24 hours at 23° C. with 65% relative humidity. Peel strength was measured at an angle of 180° and at a peel speed of 0.3 m/min by using a tensile testing machine.

TABLE 2

| | Durability | | Haze (%) | Separation charging voltage (kV) | | Separation strength (gf/25 mm) | |
|---|---|---|---|---|---|---|---|
| | Heat-resistance | Heat and moisture-resistance | | TAC | AG | TAC | AG |
| Example 1 | ○ | ○ | 0.3 | −0.3 | 0.3 | 12 | 10 |
| Example 2 | ○ | ○ | 0.2 | −0.2 | 0.3 | 11 | 9 |
| Example 3 | ○ | ○ | 0.3 | −0.2 | −0.2 | 12 | 10 |
| Example 4 | ○ | ○ | 0.2 | 0.2 | 0.3 | 12 | 10 |
| Comparative Example 1 | ○ | ○ | 0.2 | −5.0 | −4.0 | 13 | 11 |
| Comparative Example 2 | ○ | ○ | 0.3 | −0.2 | 3.0 | 11 | 10 |
| Comparative Example 3 | ○ | ○ | 0.2 | 4.0 | 0.3 | 12 | 12 |
| Comparative Example 4 | ○ | ○ | 0.3 | −3.0 | −0.3 | 10 | 9 |
| Comparative Example 5 | x | x | 5.0 | 0.3 | 0.2 | 2 | 2 |

As shown in Table 2, the protective films containing the acrylic adhesive compositions of Examples 1~4 comprising both the hydrophilic complex compound and the hydrophobic complex compound were confirmed to have low static voltage generated on the surface of the polarizing plate during the separation, indicating that the possibility of producing a poor LCD is lowered, and have excellent properties including transparency and adhesive power, compared with those protective films prepared in Comparative Examples 1~5.

INDUSTRIAL APPLICABILITY

The acrylic adhesive composition of the present invention has excellent compatibility and at the same time inhibits the development of static electricity without damaging durability, transparency and peel strength, indicating that this composition has excellent antistatic capacity, regardless of the surface condition (hydrophobicity or hydrophilicity) of a polarizing plate.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An acrylic adhesive composition, which comprises:
    a) 100 weight part of an acrylic copolymer;
    b) 0.01~10 weight part of a hydrophilic complex compound; and
    c) 0.01~10 weight part of a hydrophobic complex compound,
    wherein the hydrophilic complex compound of (b) is composed of a compound having an alkylene oxide group in its molecular structure and an ionic compound having a hydrophilic anion.

2. The acrylic adhesive composition according to claim 1, wherein the acrylic copolymer of a) is prepared by co-polymerization of i) 90~99.9 weight % of (meth)acrylic acid ester monomer having a $C_1$~$C_{12}$ alkyl group and ii) 0.1~10 weight % of vinyl monomer and/or acrylic monomer having a cross-linkable functional group.

3. The acrylic adhesive composition according to claim 2, wherein the (meth)acrylic acid ester monomer having a $C_1$~$C_{12}$ alkyl group of i) is one or more compounds selected from a group consisting of butyl(meth)acrylate, ethyl(meth)acrylate, methyl(meth)acrylate, n-propyl(meth)acrylate, iso-propyl(meth)acrylate, t-butyl(meth)acrylate, pentyl(meth)acrylate, n-octylmethacrylate, n-tetradecylmethacrylate, 2-ethylhexyl(meth)acrylate, isooctyl(meth)acrylate, isononyl(meth)acrylate and 2-ethylbutyl(meth)acrylate.

4. The acrylic adhesive composition according to claim 2, wherein the (meth)acrylic acid ester monomer having a $C_1$~$C_{12}$ alkyl group of i) is mixed with one or more co-monomers selected from a group consisting of methyl acrylate, methyl methacrylate, ethyl metherylate, vinyl acetate, styrene and acrylonitrile.

5. The acrylic adhesive composition according to claim 2, wherein the vinyl monomer and/or acrylic monomer having a cross-linkable functional group of ii) is one or more compounds selected from a group consisting of 2-hydroxyethyl (meth)acrylate, 2-hydroxypropyl(meth)acrylate, 4-hydroxybutyl(meth)acrylate, 6-hydroxyhexyl(meth)acrylate, 2-hydroxyethyleneglycol(meth)acrylate, 2-hydroxypropyleneglycol (meth)acrylate; (meth)acrylic acid, maleic acid, fumaric acid, acryl amide, N-vinyl pyrrolidone and N-vinyl caprolactam.

6. The acrylic adhesive composition according to claim 1, wherein the compound having an alkylene oxide group has one or more repetitive units selected from a group consisting of methylene oxide, ethylene oxide, propylene oxide and butylene oxide.

7. The acrylic adhesive composition according to claim 1, wherein the weight average molecular weight of the compound having an alkylene oxide group is 100~10,000.

8. The acrylic adhesive composition according to claim 1, wherein the ionic compound having a hydrophilic anion is one or more compounds selected from a group consisting of the compounds comprising anions of $ClO_4^-$, $I^-$, $Cl^-$, $Br^-$, $BF_4^-$, $PF_6^-$, $N_3^-$, $CH_3CO_2^-$, $HPO_4^{2-}$, $SO_4^{2-}$ or $NO_3^-$; and cations of lithium, sodium, potassium, magnesium, calcium, barium or cesium.

9. The acrylic adhesive composition according to claim 1, wherein the compound having an alkylene oxide group and the compound having a hydrophilic anion are mixed at the molar ratio of 1/1~1/100 ($[M^+]/[RO]$; whereby $[M^+]$ indicates the molarity of the ionic compound and [RO] indicates the molarity of the repetitive unit of alkylene oxide group).

10. The acrylic adhesive composition according to claim 1, wherein the hydrophobic complex compound of (c) is an inorganic or an organic ionic compound having a hydrophobic anion.

11. The acrylic adhesive composition according to claim 10, wherein the hydrophobic complex compound is one or more compounds selected from a group consisting of inorganic ionic compounds comprising hydrophobic anions of $CF_3SO_3^-$, $N(CF_3SO_2)_2^-$, $N(CF_3CO)_2^-$, $N(C_2F_5SO_2)_2^-$, $N(C_2F_5CO)_2^-$, $N(C_4F_9SO_2)_2^-$ or $C(CF_3SO_2)_3^-$; and cations of lithium, sodium, potassium, magnesium, calcium, barium or cesium.

12. The acrylic adhesive composition according to claim 11, wherein the inorganic ionic compound additionally includes a compound that is able to form a complex with one or more metal cations selected from a group consisting of oxalate, polyvalent acid group, diamine and acetyl ketone group.

13. The acrylic adhesive composition according to claim 10, wherein the hydrophobic complex compound is one or more compounds selected from a group consisting of organic ionic compounds comprising hydrophobic anions of $CF_3SO_3^-$, $N(CF_3SO_2)_2^-$, $N(CF_3CO)_2^-$, $N(C_2F_5SO_2)_2^-$, $N(C_2F_5CO)_2^-$, $N(C_4F_9SO_2)_2^-$ or $C(CF_3SO_2)_3^-$; and cations of pyridinium, pyridazinium, pyrimidinium, pyrazinium, imidazolium, pyrazolium, thiazolium, oxazolium, triazolium or quaternary ammonium.

14. The acrylic adhesive composition according to claim 1, wherein the composition additionally includes a cross-linking agent.

15. The acrylic adhesive composition according to claim 14, wherein the cross-linking agent is one or more compounds selected from a group consisting of isocyanate compounds, epoxy compounds, aziridine compounds and metal chelate compounds.

16. The acrylic adhesive composition according to claim 14, wherein the content of the cross-linking agent based on 100 weight part of the acrylic copolymer is 0.01~10 weight part.

17. The acrylic adhesive composition according to claim 14, wherein the composition additionally includes one or more additives selected from a group consisting of tackifier resin, acrylic low-molecular substance, epoxy resin, hardener, UV stabilizer, antioxidant, toning agent, reinforcing agent, filler, antifoaming agent, surfactant, plasticizer, blowing agent and organic salt.

18. The acrylic adhesive composition according to claim 1, wherein the composition is applied to an industrial sheet, a protective film, a cleaning sheet, a reflective sheet, or provided as part of a structural adhesive sheet, a photographic adhesive sheet, an adhesive sheet for a traffic lane, an optical adhesive product, an adhesive for an electronic device, a multiple structured laminate product, a commercial adhesive sheet product, a medical patch or heat activated pressure sensitive adhesive.

19. A protective film in which an adhesive layer covering one side or both sides of a substrate contains the acrylic adhesive composition according to claim 1, 20. A liquid crystal display device which contains a liquid crystal panel, wherein a polarizing plate coated with the protective film of claim 19 is layered on one side or both sides of a liquid crystal cell.

* * * * *